July 15, 1958 R. P. LAMBECK 2,843,212
PROPELLER PITCH STOP LOCK
Filed March 1, 1954 2 Sheets-Sheet 1

INVENTOR
RAYMOND P. LAMBECK
BY Harris & Luther
ATTORNEY

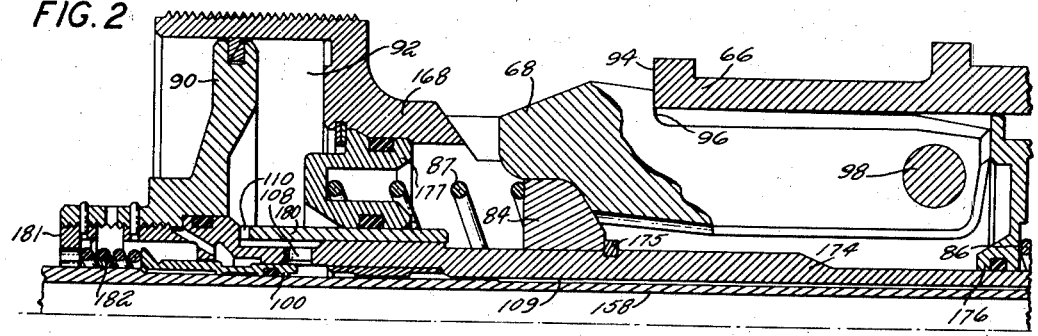
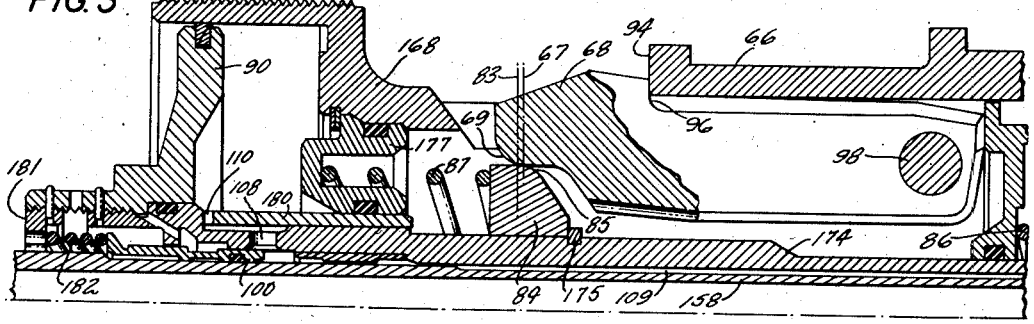
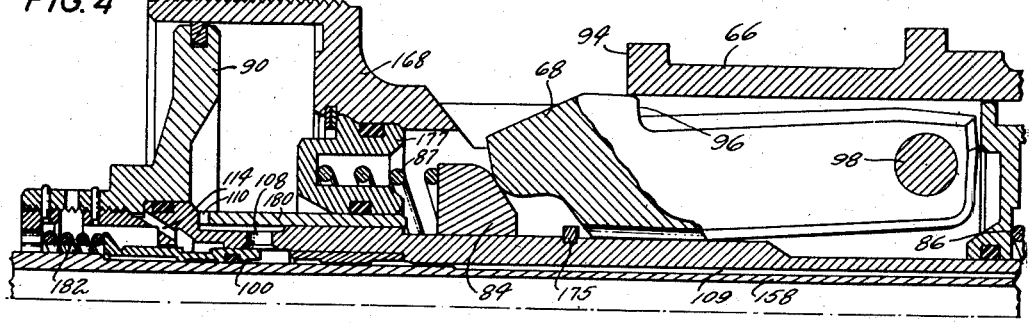
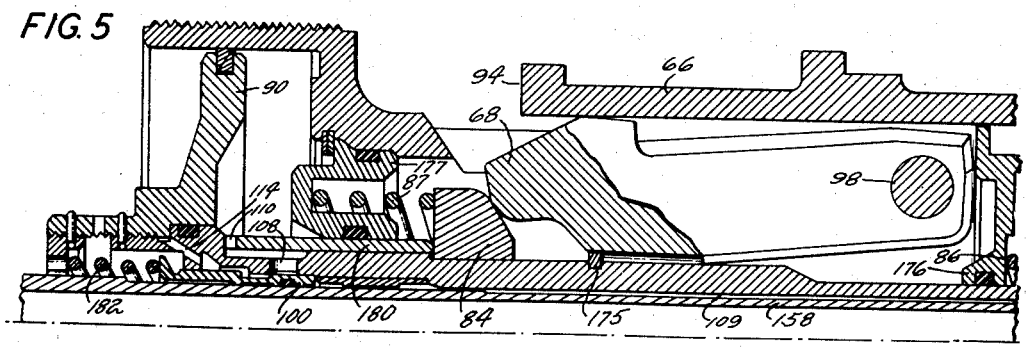

United States Patent Office 2,843,212
Patented July 15, 1958

2,843,212

PROPELLER PITCH STOP LOCK

Raymond P. Lambeck, Manchester, Conn., assignor to United Aircraft Corporation, East Hartford, Conn., a corporation of Delaware Application March 1, 1954, Serial No. 413,188

10 Claims. (Cl. 170—160.32)

This invention relates to aeronautical propellers and particularly to pitch changing mechanisms therefor.

An object of this invention is to provide mechanism for quickly locking pitch stop mechanism.

A further object is mechanism for hydraulically removing and mechanically restoring lock mechanism without waiting for the hydraulic system to drain.

A still further object is mechanism for quickly restoring the pitch stop to locked position and additional means for holding the stop in locked position.

Further objects and advantages will be apparent from the following specification and the attached drawings in which Fig. 1 is a longitudinal cross section of a controllable pitch propeller, with portions shown in full, showing pitch stops in locked position;

Fig. 2 is an enlarged section of a portion of Fig. 1 showing the servo motor about to remove the wedge from under the stop. This figure also shows the parts in the positions they would occupy at the time the wedge is restored to locking position under the pitch stop;

Fig. 3 is an enlarged section of a portion of Fig. 1 showing the wedge removed from under the stop to a position where it can be forced out by the pitch changing piston;

Fig. 4 is an enlarged section of a portion of Fig. 1 showing the wedge forced out from under the stops;

Fig. 5 is an enlarged section of a portion of Fig. 1 showing the servo motor partially returned and the wedge actuating mechanism cocked to snap the wedge to locking position upon return of the pitch changing motor piston.

Figure 1:
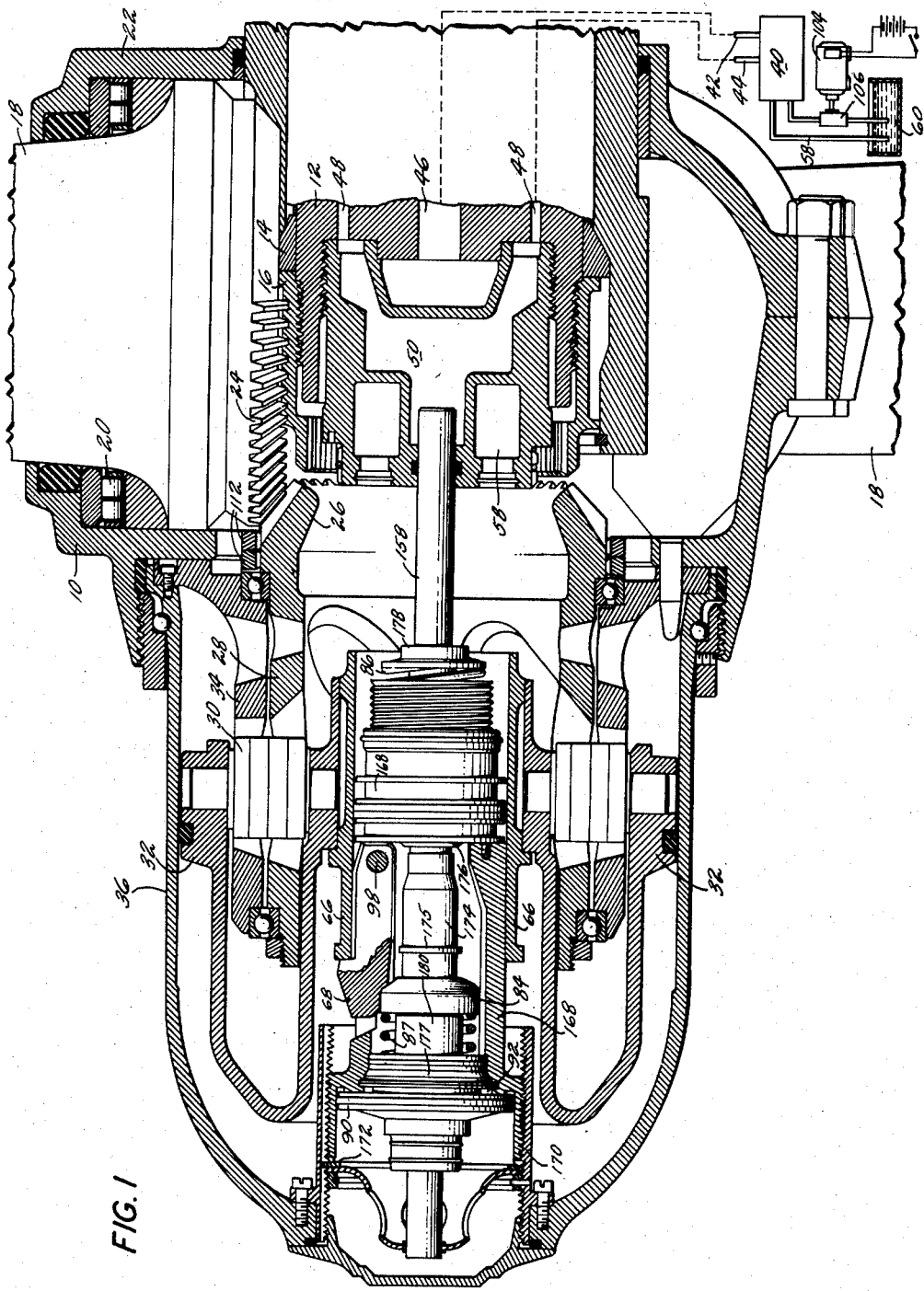

The stop mechanism and particularly the lock mechanism for the stop described herein is an improvement on the mechanism disclosed in Forman Patent No. 2,477,868, to which reference may be made for details of the propeller and pitch actuating mechanism. In the Forman device and particularly the structure shown in Fig. 3 thereof, the wedge 84 which acts as a lock for the stop 68 is restrained to move only with the piston 90. The piston 90 is moved to move the wedge 84 out of locking position by introduction of hydraulic fluid into the space 92 at the inboard side of piston 90. In order to return the wedge 84 to locking position, it is necessary to drain the fluid from the chamber 92. It has been found that under some conditions this fluid will not drain from the chamber 92 so as to permit return of the wedge 84 to locking position before a reversal of fluid flow takes place in the pitch changing mechanism so that the propeller will be returned to an extremely low or reverse pitch position after the pilot thought he had it locked so that the low pitch movements would be limited by the stop 68.

One of the objects of the improvement forming the subject matter of this application is to provide mechanism for quickly returning the wedges 84 without waiting for the chamber 92 to drain.

As in Patent No. 2,477,868, the drawings show a double-acting propeller adapted to be controlled by a governor and control mechanism of the type disclosed in U. S. Patent No. 2,402,065, of Erle Martin, to which reference may be made for a more complete disclosure of the governor and its controls. The details of the governor are not shown in this application as it is believed that they are not necessary to a complete understanding of this invention, as any governor which will supply fluid under pressure to either side of the propeller pitch changing piston to varying the pitch and maintain substantially constant speed and which includes mechanism by which fluid at a higher pressure may be supplied to one side of the piston while the other side is connected with drain or a reduced pressure will satisfactorily operate the stops forming the subject matter of the present invention.

The device used to illustrate the present invention is similar to that shown in Fig. 3 of Patent No. 2,477,868 in which fluid is applied to the front or outboard side of the pitch changing piston to increase the propeller pitch and fluid under pressure is applied to the rear or inboard side of the pitch changing piston to reduce the propeller pitch.

The propeller shown in Fig. 1 comprises a hub 10 secured on shaft 12 (which may be a part of the engine crankshaft or a separate propeller shaft) and retained in position thereon by the usual cones 14 and retaining nut 16. Hub 10 carries a plurality of blades 18, three in the modification shown, mounted for pitch changing movement on bearings 20 in hub socket 22. Each blade 18 is provided with a gear segment 24 which meshes with common gear 26 for simultaneously turning all the blades to vary their pitch. Gear 26 is actuated by and may be integral with a cam 28 which is turned by the action of cam followers 30 movable by a piston 32 and cooperating with both cam 28 and a fixed cam 34. For a more detailed description of the cam and cam followers reference may be made to Caldwell et al. Patent No. 2,174,717 or Martin et al. Patent No. 2,280,713.

Piston 32 is slidable, by a preponderance of oil under pressure on one side or the other, in a cylinder formed by dome 36. Piston 32 is in the form of an annulus and, in the center, slides over a sleeve 38 which will be described in detail below. Piston 32 is shown as sealed at the cylinder and at the sleeve by O-ring seals. From the above description it is apparent that a preponderance of oil pressure on either side of piston 32 will move the piston and cause a change in the pitch of the propeller blades.

Oil is conducted between a governor, shown schematically at 40, driven in timed relation to said propeller, and piston 32 through pipes 42 and 44 to channels 46 and 48. The governor acts to selectively increase the pressure in one line and reduce the pressure in the other in order to move the piston 32 and control the propeller pitch to maintain constant speed. Oil under pressure in channel 48 finds its way through channel 50 and tube 158 to the front side of the piston. When the governor introduces fluid through channel 48 to the front of the piston, channel 46 is connected through a line 58 with a drain or sump 60 so that oil at the back of the piston may escape as the piston moves.

In order to move the piston in an outboard direction, to the left as shown in Fig. 1, oil under pressure is introduced into channel 46 and channel 48 is connected with the sump. Oil under pressure moves through channel 46 and through line 58 finds its way to the rear of piston 32. As the front of the piston is then connected with drain the piston is moved in an outboard direction until a sleeve 66, fixed to piston 32, contacts stops 68.

Stop 68 is a bar having a hook formed at one end and pivotally connected by means of pivots 98 at the other end to sleeve 168 which is supported from and adjustably mounted on dome 36 by being threaded to sleeve 170 which is secured to the dome. A snap ring and lock 172 is used to secure sleeve 168 against rotation with respect to the dome. Any desired number of stops may be used, three being used in the preferred embodiment disclosed.

As sleeve 66 is secured to piston 32 it is obvious that the pitch position at which the stop becomes effective is determined by the longitudinal position of stop 68. This longitudinal position can be adjusted by threading sleeve 168 which carries stop 68 into or out of sleeve 170 which in turn is secured against movement in the dome 36. Stops 68 are maintained in an extended or active position by a wedge ring or anvil 84 urged by spring 87 into a supporting position under or within stops 68. A sleeve 174, adapted to slide over tube 158 and inside of wedge 84 carries a shoulder 175 adapted to contact the inboard side of wedge 84. A piston 90 slidable within a cylinder formed on the outboard end of sleeve 168 is secured to the outboard end of sleeve 174. Sleeve 174 is slidably supported in a plate 176 or bulkhead integral with or secured to the inboard end of sleeve 168. Spring 86 is compressed between plate 176 and nut 178 threaded onto the end of tube 174 and urges the tube and with it the piston 90 inboard, to the right in Fig. 3. A plug 177 secured in the outboard portion of the sleeve 168 defines a chamber 92 at the inboard side of piston 90. Nut 181 threaded into an outboard extension of piston 90 acts as an adjustable abutment for spring 182. A valve 100 slidably mounted on tube 158 is subject to the pressure acting on the inboard side of piston 32 and when that pressure exceeds a predetermined amount, is opened against the action of spring 182 to connect port 108 with the channel 109 between the tube 158 and tube 174 which in turn is connected with the area at the inboard side of piston 32. Oil under pressure applied through passage 58 to the interior of sleeve 168 and inboard of plate 176 is prevented from reaching chamber 92 by the valve 100 normally held in closed position by spring 182. Spring 182 is strong enough to prevent opening of valve 100 by the normal working pressures supplied by the governor of 60 to 120 lbs. per sq. in. differential between opposite sides of the piston 32 but this spring is weak enough so that a differential pressure of about 250 lbs. per sq. in. will open valve 100. If the usual auxiliary motor 104 and pump 106 of the governor system are energized, oil under a pressure higher than that normally supplied by the governor will be supplied. This pressure will be above 250 lbs. per sq. in. differential pressure and may be as high as 800 to 1000 lbs. per sq. in. Oil under the higher pressure will be directed by the governor to passage 58 and will open valve 100. As soon as valve 100 is opened, the larger area then exposed will immediately force the valve to its extreme position thus opening port 108 and permitting oil under the higher pressure to pass through passage 110 to chamber 92. The action of the high pressure pump will, as more fully described in U. S. Patent No. 2,402,065, connect the opposite channel 48 with drain, thus relieving the pressure on the outboard side of piston 32 and thus also relieving the pressure on the outboard side of piston 90. Opening of valve 100 will admit fluid under pressure to the inboard face of piston 90, thus forcing that piston and tube 174 and shoulder 175 outboard to the left in Fig 2 against the action of spring 86 so as to bring the shoulder 175 into contact with the inboard side of wedge 84.

Continued application of pressure to the inboard side of piston 90 will move wedge 84 outboard, to the left in Fig. 3, to the position shown in Fig. 3 where the vertical center line of the arcuate portion 85 of wedge 84 is outboard of the vertical center line 67 of the arcuate portion 69 of stop 68. The higher pressure fluid which is led through passage 58 also acts on the inboard side of piston 32 so that, with the wedges in the last described position, pressure exerted by piston 32 on sleeve 66 will provide a force component on stop 68 which, pressing on wedge 85, will produce a force component on wedge 85 which will force it outboard against the action of spring 87, thus allowing the stop 68 to be forced downward and out of the path of the sleeve 66 so that the piston 32 may move outboard and reduce the propeller pitch to pitch lower than that determined by stop 68 and even into an extreme position which may be determined by stops 112 as more fully described under above mentioned U. S. Patent No. 2,174,717.

The relative positions of the parts, when the stops have been withdrawn and the wedge or lock 84 has been moved out from under the stop 68, is shown in Fig. 4. In this position, spring 86 is held compressed by the hydraulic pressure acting on the inboard face of piston 90 and spring 87 is held compressed by wedge 84 which in turn is held in the outboard position by the retracted stops 68 which in turn are held retracted by the sleeve 66.

To unreverse the propeller after it has been placed in reverse pitch position, the governor and auxiliary pump will be operated as described in Patent No. 2,402,065 to supply the predominant pressure in channel 48 and passage 50 to the outboard side of piston 32, meanwhile connecting the inboard side of piston 32 with a drain or sump. Piston 32 and with it sleeve 66 are then forced to the right and piston 90 is likewise forced to the right, permitting spring 86 as well as spring 87 to force wedge or lock 84 to the right, thus urging stop 68 outward. As soon as surface 94 of sleeve 66 has passed inboard of hook 96 of stop 68, the stops will be forced outward through the action of wedge ring 84 and spring 87 and if the propeller is then turning, through the action of centrifugal force. When the pressure on the inboard side of the piston is relieved valve 100 will be closed by spring 182. Oil will be forced out of the chamber 92 by spring 86 and will drain through passages 110 and 108 along the outside of valve 100 and through passage 114 to the opposite side of the piston 90.

Before the sleeve 66 has passed inboard clear of the stops 68, the mechanism will assume the position shown in Fig. 5 in which the spring 86 has forced the shoulder 175 and the piston 90 to the right from the position shown in Fig. 4. The position of the piston 90 in Fig. 5 is determined by contact of a sleeve 180 forming a part of tube 174 with the outboard side of wedge or lock 84, the outboard end of sleeve 180 being slotted to provide passages 110 adjacent the piston 90. Further movement of the piston 90 to the right under the action of spring 86 is prevented as sleeve 66 prevents stops 68 from projecting and stops 68 prevent wedge or lock 84 from moving to the right and wedge 84 through sleeve 180 prevents movement of the piston 90. In this position of the parts, however, shoulder 175 has been moved sufficiently to the right so that were the stops to be projected, wedge 84 could be forced by springs 87 completely under the stops as shown in Fig. 2. In other words, the shoulder 175 occupies the same position in Fig. 5, where it is positioned by the sleeve 180, as it does in Fig. 2 where it is about to move the lock 84 from under the stop 68.

As sleeve 66 moves to the right and surface 94 of sleeve 66 lines up with or passes hook 96, spring 87 will force wedge 84 to the right and stops 68 outward into active position. Lock 84 will extend the stop 68 and move into locking position much more rapidly than would be the case if all the oil had to be forced out of chamber 92 before the lock could be forced into locking position. This quick action of the wedge 84 will effectively prevent pitch reducing movement of the piston in the event the governor or any other mechanism should call for a pitch reduction before the oil had been drained from the chamber 92.

While under many conditions the device will operate satisfactorily without sleeve 180, in which case the piston 90 could move to the extreme right hand position even while the wedges 84 were in their extreme left hand position, it was found that under certain conditions of extreme vibration and with the propeller pitch changing mechanism pushing on the stop 68 it was possible for the piston 32 acting through sleeve 66 to force the lock 84 out from under the stops 68 and permit the propeller to move toward reverse pitch position. In order to prevent this unwanted or inadvertent reversal, the sleeve 180 was added which, as shown in Fig. 1, is positioned by the springs 86 so as to hold the lock 84 in locked position. Springs 86, being much stronger than springs 87, are able to hold the lock in position against any force that may be applied by the governor control oil on the piston 32.

It will thus be seen that by providing a lost motion connection between the lock 84 and the piston 90, I am able to utilize the piston 90 to hydraulically move the lock 84 from locking position under the stop 68 and that I am able to replace the lock 84 into locking position without the necessity of draining the hydraulic fluid from in back of the piston 90. I am also able to use the piston actuating springs 86 for holding the lock 84 in locking position after the hydraulic fluid has been drained from in front of the piston 90.

As soon as the propeller has been returned to normal pitch, it may then be either manually or automatically returned to the control of the governor with assurance that the pitch will remain within the preselected range until positive action is taken to force it outside of that range. As in Patent No. 2,174,717 and No. 2,280,713 cams 28 and 34 may be provided with knees or bends at about the normal high pitch or low pitch position where the slope of the cam is abruptly changed to reduce the length of the cam and also provide fast feathering or reversing. These knees will act as stops under some conditions but may sometimes be overrun. With the positive mechanical stops above described however the range of pitch change is positively limited.

It is to be understood that the invention is not limited to the specific embodiment herein illustrated and described, but may be used in other ways without departure from its spirit as defined by the following claims.

I claim:

1. The improvement in stop mechanism for pitch changing mechanism comprising stop means projectable into the path of a portion of the pitch changing mechanism, projecting means operatively connected with said stop means for projecting and locking said stop means, power means operatively connected with said projecting and locking means for withdrawing said projecting and locking means from projecting and locking position, means operatively connected with said power means for at least partially returning said power means to an intermediate position with said projecting and locking means withdrawn and means operatively connected with said projecting and locking means for snapping said projecting and locking means into projecting and locking position while said power means is in an intermediate position and means connected with said power means and positioned by said returning means to a position adjacent said projecting and locking means for holding said projecting and locking means in locking position.

2. The improvement in stop mechanism for pitch changing mechanism comprising stop means projectable into the path of a portion of the pitch changing mechanism, projecting means operatively connected with said stop means for projecting and locking said stop means, hydraulically actuated means operatively connected with said projecting means for withdrawing said projecting means from projecting and locking position, a first spring means operatively connected with said hydraulically actuated means and opposing the action of said hydraulically actuated means for returning said hydraulically actuated means to an intermediate position with said projecting means withdrawn and effective to return said hydraulic means to its starting position after said projecting means has been returned to projecting and locking position, a second spring means operatively connected with said projecting means for snapping said projecting means into projecting and locking position while said hydraulically actuated means is in said intermediate position and means positioned by said hydraulic means in its completely returned position operatively connected with said projecting means to hold said projecting means in locking position.

3. Pitch stop locking mechanism having a movable locking member comprising hydraulic mechanism operatively connected with said locking member and including means for moving said locking member out of locking position, spring means operatively connected with said locking member for returning said locking member to locking position independent of said hydraulic mechanism, and mechanism operatively connected with said locking member and positioned by said hydraulic mechanism into cooperating relation with said locking member for holding said locking member in locking position.

4. Pitch stop lock having a movable locking member, power means, a first spring, mechanism operatively connected with said power means and said locking member and movable in one direction by said power means to move said locking member out of locking position and movable in the other direction by said spring, said locking member being connected to said mechanism by a lost motion connection, other spring means for returning said locking member to locking position and restraining means operatively connected with said locking member and positioned by said power means and said first spring means and acting on said locking member in said other direction for holding said locking member in locking position.

5. In a controllable pitch propeller, pitch stop mechanism comprising stop means projectable into the path of pitch changing mechanism to limit pitch changing movement, lock mechanism operatively connected with said stop means for locking said stop means in projected position, hydraulic mechanism having a holding position and operatively connected wtih said lock mechanism and movable to an unlocking position for moving said lock mechanism out of locking position, said stop means being retractable when said lock mechanism is out of locking position, means operatively connected with said stop means restraining said stop means in retracted position, means connected with said hydraulic mechanism for draining fluid from said hydraulic mechanism, a first spring means operatively connected with said hydraulic mechanism forcing fluid from said hydraulic mechanism and returning said hydraulic mechanism toward holding position as said fluid is drained and while said lock mechanism is out of locking position, said retracted stops preventing return of said lock mechanism to locking position, holding means carried by said hydraulically actuated mechanism and movable into contact with said lock mechanism and limiting the return movement of said hydraulic mechanism while said lock mechanism is out of locking position, a second spring means operatively connected with said lock mechanism for projecting said stop means to stop position and moving said lock mechanism to locking position as said restraining mechanism moves out of restraining position, said first spring means moving said holding means to a position adjacent said lock means after the lock means has been returned to locking position and holding said lock means in locking position.

6. A device as claimed in claim 5 in which said first spring means is stronger than said second spring means.

7. A device as claimed in claim 5 in which both spring means urge said lock means into locking position.

8. In a controllable pitch propeller, pitch stop mechanism comprising stops projectable into and retractable out of the path of pitch changing mechanism, lock mechanism operatively connected with said stops for locking said stops in projected position, said locking mechanism comprising hydraulic mechanism including an elongated member, fixed spaced abutments on said member and movable therewith, a lock slidable on said member between said abutments and movable by said hydraulic mechanism and one abutment out of locking relation with said stops, spring means continuously urging said lock toward said one abutment and against said stops when said stops are in retracted position, means operatively connected with said hydraulic mechanism draining hydraulic fluid from said hydraulic mechanism and means moving the second abutment into contact with said lock mechanism with said stops retracted, said spring means snapping said lock mechanism from said second abutment to said first abutment upon projection of said stops, said moving means subsequently moving said hydraulic mechanism and said second abutment to bring said second abutment into contact with said lock mechanism with the lock mechanism in locking position.

9. A pitch stop for a hydro-controllable pitch propeller comprising, a pitch changing means movable through a predetermined path relative to a fixed structure, a hook mounted for movement about a pivot carried by said fixed structure, a spring, wedge means operatively associated with said hook and urged into active position by said spring for forcing said hook about said pivot into projected position in said path to limit movement of said pitch changing means, hydraulic means actuated by pitch changing hydraulic fluid, operatively connected with said wedge means, and having a limited movement with respect to said wedge means, means operatively associated with said hydraulic means and said wedge means limiting relative movement of said wedge means and said hydraulic means in both directions, said limiting means, upon movement of said hydraulic means in one direction, moving said wedge means into inactive position, said pitch changing means adapted to restrain said hook against projection, said hook, when restrained against projection, holding said spring actuated wedge means in inactive position, means operatively connected with said hydraulic means forcing hydraulic fluid from said hydraulic means, moving said hydraulic means relative to said wedge means, and returning said hydraulic means a limited distance while said wedge means is in inactive position, said limiting means limiting the return movement of said hydraulic means while said wedge means is in inactive position, said spring means being effective to return said wedge means to active position independent of said hydraulic means and move said hook into restraining position upon movement of said pitch changing means beyond a predetermined position in a pitch increasing direction, said forcing means and said limiting means holding said wedge means in active position.

10. In a controllable pitch propeller, pitch stop mechanism comprising stop means projectable into the path of pitch changing mechanism to limit pitch changing movement, lock mechanism operatively connected with said stop means and having a locking position locking said stop means in projected position, lock moving means operably connected with said lock mechanism and movable with respect to said lock mechanism and having a holding position, and unlocking position and an intermediate position, a motor, connected with said lock moving means, moving said lock moving means with respect to said lock mechanism from said holding position to said intermediate position and moving said lock moving means from said intermediate position to said unlocking position and moving said lock mechanism from said locking position to an unlocking position, said stops being retractable when said lock mechanism is in unlocking position, means actuated by said pitch changing means coacting with said stops and holding said stops in retracted position and said lock mechanism in unlocked position, means returning said lock moving means to said intermediate position while said lock mechanism is held in unlocked position, limiting means, including means carried by said lock moving means, coacting with said stop mechanism and limiting return movement of said lock moving means to said intermediate position when said stops are in retracted position, means, operatively connected with said lock mechanism projecting said stops and moving said lock mechanism to locking position and temporarily disabling said limiting means upon removal of said stop holding means from holding position, said returning means moving said lock moving means from said intermediate position to said holding position and said limiting means to a holding position in which said limiting mechanism coacts with said lock mechanism and holds said lock mechanism in locking position while said lock moving means is in holding position.

References Cited in the file of this patent

UNITED STATES PATENTS

| | | |
|---|---|---|
| 2,477,868 | Forman | Aug. 2, 1949 |
| 2,542,463 | Beard | Feb. 20, 1951 |
| 2,655,999 | Basevi | Oct. 20, 1953 |
| 2,663,373 | Richmond | Dec. 22, 1953 |
| 2,704,583 | Jedrziewski | Mar. 22, 1955 |